United States Patent [19]

Schoenberg

[11] Patent Number: 4,643,943

[45] Date of Patent: * Feb. 17, 1987

[54] MULTI-LAYER POLYOLEFIN SHRINK FILM

[75] Inventor: Julian H. Schoenberg, Greenville, S.C.

[73] Assignee: W. R. Grace & Co., Cryovac Div., Duncan, S.C.

[*] Notice: The portion of the term of this patent subsequent to Apr. 30, 2002 has been disclaimed.

[21] Appl. No.: 694,362

[22] Filed: Jan. 24, 1985

Related U.S. Application Data

[63] Continuation-in-part of Ser. No. 615,418, May 30, 1984, Pat. No. 4,514,465.

[51] Int. Cl.$^4$ .............................................. B32B 27/08
[52] U.S. Cl. .................................. 428/339; 428/332; 428/515; 428/516; 428/520
[58] Field of Search ............... 428/332, 339, 483, 515, 428/516, 520

[56] References Cited

U.S. PATENT DOCUMENTS

| | | | |
|---|---|---|---|
| 3,595,735 | 7/1971 | Tyrrell . | |
| 3,817,821 | 6/1974 | Gallini | 428/516 X |
| 4,022,646 | 5/1977 | Casey | 428/516 X |
| 4,044,187 | 8/1977 | Kremkau | 428/516 |
| 4,162,343 | 7/1979 | Wilcox et al. | 428/520 X |
| 4,339,507 | 7/1982 | Kurtz . | |
| 4,364,981 | 12/1982 | Horner . | |
| 4,399,173 | 8/1983 | Anthony . | |
| 4,399,180 | 8/1983 | Briggs . | |
| 4,403,053 | 9/1983 | Lewis . | |
| 4,425,268 | 1/1984 | Cooper . | |
| 4,438,238 | 3/1984 | Fukushima . | |
| 4,444,828 | 4/1984 | Anthony . | |
| 4,447,480 | 5/1984 | Lustig . | |
| 4,457,960 | 7/1984 | Newsome . | |
| 4,524,099 | 6/1985 | Di Luccio . | |

FOREIGN PATENT DOCUMENTS

| | | |
|---|---|---|
| 0071349 | 2/1983 | European Pat. Off. . |
| 0095299 | 11/1983 | European Pat. Off. . |
| 2019412 | 10/1979 | United Kingdom . |
| 2115348 | 9/1983 | United Kingdom . |
| 2123747 | 2/1984 | United Kingdom . |

OTHER PUBLICATIONS

Plastics World, Feb., 1981, Article entitled "LDPE meets its match Linear LDPE", pp. 45-50.
Modern Plastics, Aug., 1982, Articles entitled "LLDPE/HDPE" and Copolymers, p. 44.
Modern Plastics, Jan., 1982, Article entitled "More New-Generation PE on the Way; It could do wonders for '82 Business", pp. 56-57.

Primary Examiner—Lorraine T. Kendell
Attorney, Agent, or Firm—John J. Toney; William D. Lee, Jr.; Mark B. Quatt

[57] ABSTRACT

A five layered thermoplastic film may be utilized to form storm windows or packaging material. A preferred embodiment of the film comprises a core layer consisting essentially of either (a) a copolymer of ethylene and vinyl acetate or (b) a three component blend of (a) a linear low density polyethylene, (b) a linear medium density polyethylene and (c) an ethylene vinyl acetate copolymer. The preferred embodiment also comprises two intermediate layers each consisting essentially of a linear low density polyethylene, and two surface layers each consisting essentially of either a four component blend of (1) a linear low density polyethylene, (2) a linear medium density polyethylene, (3) a copolymer of ethylene and vinyl acetate and (4) one or more light stabilizers, or a three component blend in which light stabilizers are not present.

17 Claims, 1 Drawing Figure

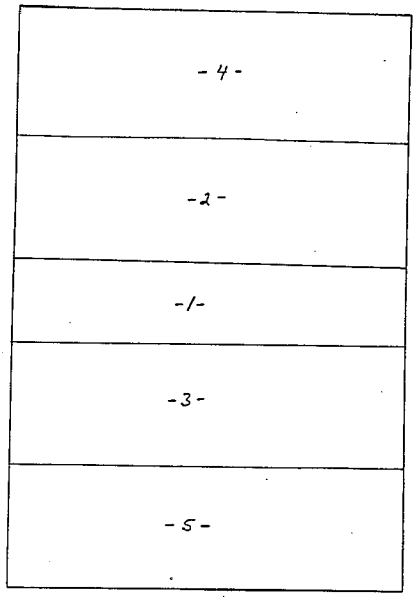

- 4 -

- 2 -

- 1 -

- 3 -

- 5 -

MULTI-LAYER POLYOLEFIN SHRINK FILM

This application is a continuation-in-part of U.S. Ser. No. 615,418, filed May 30, 1984, now U.S. Pat. No. 4,514,465.

FIELD OF THE INVENTION

The present invention relates to an elastic and heat shrinkable thermoplastic film which may be utilized as a storm window. The film may also be utilized as a packaging material. A preferred embodiment of the present invention comprises a palindromic five layer film having a core layer comprising either (a) an ethylene vinyl acetate copolymer or (b) a three component blend of (1) a linear low density polyethylene, (2) a linear medium density polyethylene and (3) an ethylene vinyl acetate copolymer. The core layer is located between two intermediate layers each of which comprise a linear low density polyethylene. Two surface layers each comprising a four component blend of (1) a linear low density polyethylene, (2) a linear medium density polyethylene, (3) an ethylene vinyl acetate copolymer and (4) one or more ultraviolet light stabilizers are also present in the preferred embodiment. A desired combination of physical characteristics beneficially results from this structure.

BACKGROUND OF THE INVENTION

The present invention is directed to new and useful multi-layer heat shrinkable film formulations. One distinguishing feature of a heat shrink film is the film's ability, upon exposure to a certain temperature, to shrink or, if restrained from shrinking, to generate shrink tension within the film.

The manufacture of shrink films, as is well known in the art, may be generally accomplished by the extrusion (single and multi-layer films) or coextrusion (multi-layer films) of thermoplastic resinous materials which have been heated to their flow or melting point from an extrusion or coextrusion die in, for example, either tubular or planer (sheet) form. After a post extrusion quenching to cool by, for example, the well-known cascading water method, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range an orientable material may be effectively oriented.

The terms "orientation" or "oriented" are used herein to generally describe the process step and resultant product characteristics obtained by stretching and immediately cooling a resinous thermoplastic polymeric material which has been heated to a temperature within its orientation temperature range so as to revise the molecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction uniaxial orientation results. When the stretching force is applied in two directions biaxial orientation results. The term oriented is also used herein interchangeably with the term "heat shrinkable" with these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film) and initially cooled to by, for example, cascading water quenching, is then reheated to within its orientation temperature range and oriented by stretching. The stretching to orient may be accomplished in many ways such as, for example, by "blown bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to rapidly cool the film and thus set or lock-in the oriented (aligned) molecular configuration.

Of course, if a film having little or no orientation is desired, e.g. non-oriented or non-heat shrinkable film, the film may be formed from a non-orientable material or, if formed from an orientable material may be "hot blown". In forming a hot blown film the film is not cooled immediately after extrusion or coextrusion but rather is first stretched shortly after extrusion while the film is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

If an orientable material is utilized, the degree of stretching controls the degree or amount of orientation present in a given film. Greater degrees of orientation are generally evidenced by, for example, increased values of shrink tension and orientation release stress. That is, generally speaking, for films manufactured from the same material under otherwise similar conditions, those films which have been stretched, e.g. oriented, to a greater extent will exhibit larger values for free shrink, shrink tension and/or orientation release stress. As stated above, the last two values are to be measured in accordance with ASTM-D-2838-81. The first value should be measured in accordance with ASTM D 2732-70 (reapproved 1976).

After setting the stretch-oriented molecular configuration the film may then be stored in rolls and utilized to tightly package a wide variety of items. In this regard, the product to be packaged may first be enclosed in the heat shrinkable material by heat sealing the shrink film to itself where necessary and appropriate to form a pouch or bag and then inserting the product therein and closing the bag or pouch by heat sealing or other appropriate means such as, for example, clipping. If the material was manufactured by "blown bubble" techniques the material may still be in tubular form or it may have been slit and opened up to form a sheet of film material. Alternatively, a sheet of the material may be utilized to over-wrap the product which may be in a tray. These packaging methods are all well known to those of skill in the art. Thereafter, the enclosed product may be subjected to elevated temperatures by, for example, passing the enclosed product through a hot air or hot water tunnel. This causes the enclosing film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable to first slit the tubular film to form a film sheet and thereafter form the sheet into bags or pouches. Such bag or pouch forming methods, likewise, are well known to those of skill in the art.

Another alternative use for heat shrink film is in the formation of low cost storm windows. In this application a sheet of the material may be attached to the window frame and thereafter heat shrunk, for example by using a hand held electric hair dryer, to tighten the film and improve the overall appearance of the window. Alternatively, the film may be stretched across the window casement or housing and attached thereto without post attachment heat shrinking.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, multiple layers may be first coextruded with additional layers thereafter being extrusion coated thereon. Or two multi-layer tubes may be coextruded with one of the tubes thereafter being extrusion coated or laminated onto the other. The extrusion coating method of film formation may be preferable to coextruding the entire film when it is desired to subject one or more layers of the film to a treatment which may be harmful to one or more of the other layers. Exemplary of such a situation is a case where it is desired to irradiate one or more layers of a film containing an oxygen barrier layer comprised of one or more copolymers of vinylidene chloride and vinyl chloride. Those of skill in the art generally recognize that irradiation is generally harmful to such oxygen barrier layer compositions. Accordingly, by means of extrusion coating, one may first extrude or coextrude a first layer or layers, subject that layer or layers to irradiation and thereafter extrusion coat the oxygen barrier layer and, for that matter, other layers sequentially onto the outer surface of the extruded previously irradiated tube. This sequence allows for the irradiation cross-linking of the first layer or layers without subjecting the oxygen barrier layer or other sequentially added layers to the harmful effects thereof.

Irradiation of an entire film or a layer or layers thereof may be desired so as to improve the film's resistance to abuse and/or puncture and other physical characteristics. It is generally well known in the art that irradiation of certain film materials results in the cross-linking of the polymeric molecular chains contained therein and that such action generally results in a material having improved abuse resistance. When irradiation is employed to accomplish the cross-linking, it may be accomplished by the use of high energy irradiation using electrons, X-rays, gamma rays, beta rays, etc. Preferably, electrons are employed of at least about $10^4$ electron volt energy. The irradiation source can be a Van der Graaff electron accelerator, e.g. one operated, for example, at about 2,000,000 volts with a power output of about 500 watts. Alternatively, there can be employed other sources of high energy electrons such as the General Electric 2,000,000 volt resonant transformer or the corresponding 1,000,000 volt, 4 kilowatt, resonant transformer. The voltage can be adjusted to appropriate levels which may be, for example, 1,000,000 or 2,000,000 or 3,000,000 or 6,000,000 or higher or lower. Other apparatus for irradiating films are known to those of skill in the art. The irradiation is usually carried out at between about one megarad and about 75 megarads, with a preferred range of about 8 megarads to about 20 megarads. Irradiation can be carried out conveniently at room temperature, although higher and lower temperatures, for example, about 0° C. to about 60° C. may be employed.

Cross-linking may also be accomplished chemically through utilization of peroxides as is well known to those of skill in the art. A general discussion of cross-linking can be found at pages 331 to 414 of volume 4 of the Encyclopedia of Polymer Science and Technology, Plastics, Resins, Rubbers, Fibers published by John Wiley & Sons, Inc. and copyrighted in 1966. This document has a Library of Congress Catalog Card No. of 64-22188.

Another possible processing variation is the application of a fine mist of a silicone or anti-fog spray to the interior of the freshly extruded tubular material to improve the further processability of the tubular material. A method and apparatus for accomplishing such internal application is disclosed in a European patent application under publication No. of 0071349A2. This document was published on or about Feb. 9, 1983 and discloses the application of a coating of a polyorganosiloxane onto the internal surface of monolayer tubular linear polyethylene films.

The polyolefin family of shrink films and, in particular, the polyethylene family of shrink films provide a wide range of physical and performance characteristics such as, for example, shrink force (the amount of force that a film exerts per unit area of its cross-section during shrinkage), the degree of free shrink (the reduction in linear dimension in a specified direction that a material undergoes when subjected to elevated temperatures while unrestrained), tensil strength (the highest force that can be applied to a unit area of film before it begins to tear apart), heat sealability (the ability of the film to heat seal to itself or another given surface), shrink temperature curve (the relationship of shrink to temperature), tear initiation and tear resistance (the force at which a film will begin to tear and continue to tear), optics (gloss, haze and transparency of material), elongation (the degree the film will stretch or elongate at room temperature), elastic memory (the degree a film will return to its original unstretched (unelongated) dimension after having been elongated at room temperature), and dimensional stability (the ability of the film to retain its original dimensions under different types of storage conditions). Film characteristics play an important role in the selection of a particular film and they may differ from each film application.

In view of the many above-discussed physical characteristics which are associated with polyolefin films and films containing a polyolefin constituent and in further view of the numerous applications with which these films have already been associated and those to which they may be applied in the future, it is readily discernable that the need for ever improving any or all of the above described physical characteristics or combinations thereof in these films is great, and, naturally, ongoing. In particular, the quest for films which may be utilized as a low cost storm window material has been ongoing since such a film application could compete well with the much more expensive permanent glass storm windows which have been historically utilized. A low cost heat shrink storm window film should preferably possess (1) good optical characteristics so that the function of the window is not undesirably degraded, (2) high physical abuse resistance, (3) good resistance to degradation from light, (4) good elongation (so that it may be stretched tightly onto the window frame prior to attachment thereto), (5) good elastic memory (so that it will not readily permanently deform when subjected to the forces of nature—e.g. wind, rain, small debris) and (6) a low to moderate degree of orientation (so that, if desired, the film may be shrunk into tight configuration with the window frame without generating an undesirable degree of tension within the film). Orientation also provides the film with improved physical characteristics such as, for example, good tensile strength.

In particular, the present multilayer film is preferable to a presently manufactured monolayer storm window film which should be utilized only on the interior side of the window. This prior art monolayer film preferably comprises a single layer of linear medium density polyethylene material having a polyorganosiloxane coating on one side thereof. For details of this film reference should be made to the above-identified European Patent Application Publication No. 0071349A2.

Other prior art films utilizing linear polyethylene materials and blends thereof are known to those of skill in the art. Exemplary multilayer prior art films having a core layer of linear low density polyethylene material are U.S. Pat. No. 4,364,981 to Horner which discusses a three layer film having a core layer of low pressure, low density polyethylene (LLDPE) and outer layers of high pressure, low density polyethylene (conventional low density polethylene) and U.S. Pat. No. 4,399,180 to Briggs which discusses a stretch-wrap film having a core layer of linear low density polyethylene with a layer, on at least one side, comprising a highly branched low density polyethylene. U.S. Pat. No. 4,399,173 to Anthony discusses a multilayer film comprising a core layer of low melt index, low pressure, low density polyethylene and two outer layers of a high melt index, low pressure, low density polyethylene. U.S. Pat. No. 4,425,268 to Cooper discloses a composition adapted for processing into stretch-wrap film. Generally, the Cooper composition comprises a blend of an ethylene vinyl acetate copolymer and a linear low density polyethylene material. The material may also contain a tackifier.

OBJECTS OF THE PRESENT INVENTION

Accordingly, it is a general object of the present invention to provide an elastic heat shrinkable film which is useful as a low cost storm window. The film may also be utilized in conventional packaging applications, if desired.

It is another object of the present invention to provide an elastic heat shrinkable film having a desired new and improved combination of physical characteristics such as, for example, a low degree of orientation or heat shrinkability combined with good puncture and tear resistance along with good elongation and elastic memory (elasticity or snap-back).

Yet another object of the present invention is to provide an elastic five layer heat shrink film having a core layer comprising either (a) an ethylene vinyl acetate copolymer or (b) a three component blend of (1) a linear low density polyethylene, (2) a linear medium density polyethylene and (3) an ethylene vinyl acetate copolymer; two intermediate layers each comprising a linear low density polyethylene, with the core layer being located between the two intermediate layers and two surface layers each comprising a four component blend of (1) a linear low density polyethylene, (2) a linear medium density polyethylene, (3) an ethylene vinyl acetate copolymer and (4) one or more ultraviolet stabilizers.

Still another object of the present invention is to provide an elastic five layer palindromic film having a core layer consisting essentially of either (1) an ethylene vinyl acetate copolymer or (b) a three component blend of (1) linear low density polyethylene, (2) linear medium density polyethylene and (3) an ethylene vinyl acetate copolymer; two intermediate layers each consisting essentially of a linear low density polyethylene and two surface layers each consisting essentially of a four component blend of (1) a linear low density polyethylene, (2) a linear medium density polyethylene, (3) an ethylene vinyl acetate copolymer and (4) one or more ultraviolet stabilizers.

An even further object of the present invention is to provide an elastic five layer heat shrink palindromic film comprising a core layer comprising either (a) an ethylene vinyl acetate copolymer or (b) a three component blend of (1) from about 40% to about 60%, by weight, of linear low density polyethylene, (2) from about 20% to about 30%, by weight, of linear medium density polyethylene and (3) from about 20% to about 30%, by weight, of an ethylene vinyl acetate copolymer; two intermediate layers each comprising linear low density polyethylene and two surface layers each comprising a four component blend of (1) from about 40% to about 60%, by weight, of linear low density polyethylene, (2) from about 20% to about 30%, by weight, of linear medium density polyethylene, (3) from about 20% to about 30%, by weight, of an ethylene vinyl acetate copolymer and (4) from about 500 to about 3,000 ppm (parts per million) of one or more ultraviolet stabilizers.

One other object of the present invention is to provide an elastic five layer heat shrink palindromic film comprising a core layer consisting essentially of either (a) an ethylene vinyl acetate copolymer or (b) a three component blend of (1) from about 40% to about 60%, by weight, of linear low density polyethylene, (2) about 20% to about 30%, by weight, linear medium density polyethylene and (3) from about 20% to about 30%, by weight, of an ethylene vinyl acetate copolymer; two intermediate layers each consisting essentially of about 100%, by weight, of linear low density polyethylene and two surface layers each consisting essentially of a four component blend of (1) from about 40% to about 60%, by weight, of linear low density polyethylene, (2) from about 20% to about 30%, by weight, of linear medium density polyethylene, (3) from about 20% to about 30%, by weight, of an ethylene vinyl acetate copolymer and (4) from about 500 to about 3,000 ppm of one or more ultraviolet stabilizers.

Yet a further object of the present invention is to provide an elastic five layer heat shrink palindromic film adapted for use as a storm window which comprises a core layer consisting essentially of either (a) about 100%, by weight, of an ethylene vinyl acetate copolymer or (b) a three component blend of (1) about 55%, by weight, of a linear low density polyethylene, (2) about 28%, by weight, of a linear medium density polyethylene and (3) about 17%, by weight, of an ethylene vinyl acetate copolymer; two intermediate layers each consisting essentially of about 100%, by weight, of a linear low density polyethylene and two surface layers each consisting essentially of a four component blend of (1) about 50%, by weight, linear low density polyethylene, (2) about 25%, by weight, of linear medium density polyethylene, (3) about 25%, by weight, of an ethylene vinyl acetate copolymer and (4) about 1,500 ppm of a hindered amine ultraviolet light stabilizer.

An additional object of the present invention is to provide an elastic five layer heat shrinkable film having a desired new and improved combination of physical characteristics such as, for example a relatively high degree of orientation or heat shrinkability.

One other object of the present invention is to provide an elastic five layer heat shrinkable film having a core layer comprising either (a) an ethylene vinyl acetate copolymer or (b) a three component blend of (1) a linear low density polyethylene (2) a linear medium density polyethylene and (3) an ethylene vinyl acetate copolymer; two intermediate layers each comprising a linear low density polyethylene, with the core layer being located between the two intermediate layers; and two surface layers each comprising a three component blend of (1) a linear low density polyethylene, (2) a linear medium density polyethylene, and (3) an ethylene vinyl acetate copolymer.

It is yet a further object of the present invention to provide a heat shrinkable film as described immediately above wherein the film is stretch oriented or biaxially oriented in the range of from about 4.0 to about 6.0 times the original dimensions in both the transverse (TD) and longitudinal (MD) directions.

Still further objects and the broad scope of applicability of the present invention will become apparent to those of ordinary skill in the art from the details disclosed hereinafter. However, it should be understood that the following detailed description which indicates the presently preferred embodiment of the present invention is only given for purposes of illustration since various changes and modifications well within the scope of the present invention will become apparent to those of ordinary skill in the art in view of the following detailed description.

DEFINITIONS

Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible symmetrical structures of the material. These structures include, but are not limited to, isotactic, syndiotactic and random symmetries.

The term "melt flow" as used herein is the amount, in grams, of a thermoplastic resin which can be forced through a given orifice under a specified pressure and temperature within ten minutes. The value should be determined in accordance with ASTM D 1238-79. The term "melt flow index" refers specifically to the value obtained in accordance with condition E of ASTM D 1238-79.

The terms "surface" or "surface layer" or "skin" or "skin layer" as used herein means a layer of a multi-layer film which comprises a surface thereof.

The term "interior" or "interior layer" as used herein refers to a layer of a multi-layer film which is not a skin or surface layer of the film.

The term "core" or "core layer" as used herein refers to an interior layer of a multi-layer film having an odd number of layers wherein the same number of layers is present on either side of the core layer.

The term "intermediate" or "intermediate layer" as used herein refers to an interior layer of a multi-layer film which is positioned between a core layer and a surface layer of said film.

The term "palindromic" film as used herein refers to a multi-layer film the layer configuration of which is substantially symmetrical. Examples of palindromic films would be films having the following layer configurations: (1) A/B/A, (2) A/B/B/A, (3) A/B/C/B/A, etc. An example of a non-palindromic film layer configuration would be a film having a layer configuration of A/B/C/A.

The term polyolefin as used herein refers to polymers of relatively simple olefins such as, for example, ethylene, propylene, butenes, isoprenes and pentenes; including, but not limited to, homopolymers, copolymers, blends and modifications of such relatively simple olefins.

The term "polyethylene" as used herein refers to a family of resins obtained by polymerizing the gas ethylene, $C_2H_4$. By varying the catalysts and methods of polymerization, properties such as density, melt index, crystallinity, degree of branching and cross-linking, molecular weight and molecular weight distribution can be regulated over wide ranges. Further modifications are obtained by copolymerization, chlorination, and compounding additives. Low molecular weight polymers of ethylene are fluids used as lubricants; medium weight polymers are waxes miscible with paraffin; and the high molecular weight polymers (generally over 6,000) are resins generally used in the plastics industry. Polyethylenes having densities ranging from about 0.900 grams or less per cubic centimeter to about 0.925 grams per cubic centimeter are called low density polyethylenes with those having densities from about 0.926 grams per cubic centimeter to about 0.940 grams per cubic centimeter being called medium density polyethylenes. Polyethylenes having densities of from about 0.941 grams per cubic centimeter to about 0.965 grams per cubic centimeter and over are generally called high density polyethylenes. Conventional low density types of polyethylenes are usually polymerized at high pressures and temperatures whereas conventional high density polyethylenes are usually polymerized at relatively low temperatures and pressures. The molecular structure of conventional low density polyethylenes is highly branched. While conventional medium density polyethylenes possess a molecular structure which is branched, the degree of branching is less than that of conventional low density polyethylenes. The molecular structure of high density polyethylenes generally possess little or no side branching.

The terms "linear low density polyethylene" or "linear medium density polyethylene" as used herein refer to copolymers of ethylene with one or more comonomers selected from $C_4$ to $C_{10}$ alpha olefins such as butene-1, octene, etc. in which the molecules of the copolymers comprise long chains with few side chains, branches or cross-linked structures. This molecular structure is to be contrasted with conventional low or medium density polyethylenes which are more highly branched than their respective linear counterparts. Moreover, the side branching which is present in linear low or linear medium density polyethylenes will be short as compared to the respective conventional polyethylenes. The molecular chains of a linear polymer may be intertwined, but the forces tending to hold the molecules together are believed to be physical rather than chemical and thus may be weakened by energy applied in the form of heat. Linear low density polyethylene as defined herein has a density usually in the range of from about 0.900 or less grams per cubic centimeter to about 0.925 grams per cubic centimeter and, preferably, the density should be maintained between 0.916 grams per cubic centimeter to 0.925 grams per cubic centimeter. Linear medium density polyethylene, as defined herein, has a density usually in the range of from about 0.926 grams per cubic centimeter to about 0.941 grams per cubic centimeter. The melt flow index of linear low and medium density polyethylenes generally ranges from between about 0.1 to about 10 grams per ten minutes and preferably between from about 0.5 to about 3.0 grams per ten minutes. Linear low and linear medium density polyethylene resins of this type are commercially available and are manufactured in low pressure vapor phase and liquid phase processes using transition metal catalysts.

The term "ethylene vinyl acetate copolymer" (EVA) as used herein refers to a copolymer formed from ethylene and vinyl acetate monomers wherein the ethylene derived units in the copolymer are present in major amounts and the vinyl acetate derived units in the copolymer are present in minor amounts.

An "oriented" or "heat shrinkable" material is defined herein as a material which, when heated to an appropriate temperature above room temperature (for example 96° C.), will have a free shrink of 5% or greater in at least one linear direction.

All compositional percentages used herein are calculated on a "by weight" basis.

Density should be measured in accordance with ASTM D 1505-68 (reapproved 1979).

Free shrink should be measured in accordance with ASTM D 2732.

Shrink tension and orientation release stress should be measured in accordance with ASTM D 2838-81.

The tensile properties of the film should be measured in accordance with ASTM D 882-81.

The elongation properties of the film should be measured in accordance with ASTM D 638.

The haze and luminous transmittance of the film should be measured in accordance with ASTM D 1003-61 (reapproved 1971).

The specular gloss of the film should be measured in accordance with ASTM D 2457-70 (reapproved 1977).

The tear propagation of the film should be measured in accordance with ASTM D 1938-67 (reapproved 1978).

The impact resistance of the film should be measured in accordance with ASTM D 3420-80.

One method for determining whether a material is "cross-linked" is to reflux the material in boiling toluene or xylene, as appropriate, for forty (40) hours. If a weight percent residue of at least 5 percent remains the material is deemed to be cross-linked. A procedure for determining whether a material is cross-linked vel non is to reflux 0.4 gram of the material in boiling toluene or another appropriate solvent, for example xylene, for twenty (20) hours. If no insoluble residue (gel) remains the material may not be cross-linked. However, this should be confirmed by the "melt flow" procedure below. If, after twenty (20) hours of refluxing insoluble residue (gel) remains the material is refluxed under the same conditions for another twenty (20) hours. If more than 5 weight percent of the material remains upon conclusion of the second refluxing the material is considered to be cross-linked. Preferably, a least two replicates are utilized. Another method whereby cross-linking vel non and the degree of cross-linking can be determined is by ASTM-D-2765-68 (Reapproved 1978). Yet another method for determining whether a material is cross-linked vel non is to determine the melt flow of the material in accordance with ASTM D 1238-79 at 230° Centigrade while utilizing a 21,600 gram load. Materials having a melt flow of greater than 75 grams per ten minutes shall be deemed to the non-cross-linked. This method should be utilized to confirm the "gel" method described above whenever the remaining insoluble gel content is less than 5% since some cross-linked materials will evidence a residual gel content of less than 5 weight percent. If the cross-linking is accomplished by irradiation of the film the amount of ionizing radiation which has been absorbed by a known film material can be calculated by comparing the weight percent of insoluble material (gel) remaining after refluxing the sample to the weight percents of gel remaining after refluxing standards of the same material which have been irradiated to different known degrees. Those of skill in the art also recognize that a correlation exists between the amount of ionizing irradiation absorbed and the melt flow of a material. Accordingly, the amount of ionizing irradiation which a material has absorbed may be determined by comparing the melt flow of the material to the melt flow of samples of the same material which have been irradiated to different known degrees.

The term "crystalline" or "crystalline polymer" material, etc. as used herein refers to a polymeric material which is composed of molecular chains which are so constructed that they can pack together well in ordered arrangements. The finite volume throughout which the order extends is designated by the term "crystallite" with the surrounding disordered regions, if any, being designated by the term "amorphous". The crystallites are denser than the surrounding amorphous regions of the material and also have a higher refractive index. If a crystalline material is oriented the crystallites become generally aligned with each other. Three well known methods for determining the degree of crystallinity are by (1) (a) measuring the specific volume of the specimen (V), (b) measuring the specific volume of the crystallites (Vc) within the specimen and (c) measuring the specific volume of the amorphous region (Va) contained within the specimen and then utilizing the equation [% crystallinity$=(Va-V)/(Va-Vc)$], (2) X-ray diffraction methods and (3) infrared absorption methods. All of these methods are well known to those in the art. A general discussion of crystallinity can be found at pages 449 to 527 of volume 4 of the Encyclopedia of Polymer Science and Technology, Plastics, Resins, Rubbers, Fibers published by John Wiley & Sons, Inc. and copyrighted in 1966. This document has a Library of Congress Catalogue Card No. of 64-22188.

The term "gauge" is a unit of measure applied to the thickness of films or the layers thereof. 100 gauge is equal to 1 mil which is one thousandth of an inch.

A rad is the quantity of ionizing radiation that results in the absorption of 100 ergs of energy per gram of a radiated material, regardless of the source of the radiation. A megarad is $10^6$ rads. (MR is an abbreviation for megarad.)

The term "yield point" as used herein refers to the percentage of stretch a film may be subjected to without evidencing significant permanent deformation. For example, a film with a yield point of 10% would substantially return to its original unstretched dimensions if stretched 9%. The same film would not substantially return to its original unstretched dimensions if stretched 15%.

SUMMARY OF THE INVENTION

It has been discovered that a flexible, heat shrinkable thermoplastic film having a desirable combination of physical characteristics such as, a low degree of orientation or heat shrinkability, good elongation of at least from about 100% to about 300% or greater, good puncture and tear resistance, good elastic memory, e.g. snapback or elastic recovery (Preferably the film has a yield point in the range of from about 5% elongation to about 15% elongation.), and good resistance to light degradation has been achieved by the flexible film of the present invention. The film may be preferably utilized as a low cost storm window. The film may also be used in film packaging applications.

The film comprises a core layer comprising either (a) an ethylene vinyl acetate copolymer or (b) a three component blend of (1) a linear low density polyethylene, (2) a linear medium density polyethylene and (3) an ethylene vinyl acetate, copolymer; two intermediate layers each comprising a linear low density polyethylene and two surface layers each comprising a four component blend of (1) a linear low density polyethylene, (2) a linear medium density polyethylene, (3) an ethylene vinyl acetate copolymer and (4) one or more ultraviolet stabilizers. A preferred embodiment of the film comprises a core layer consisting essentially of either (a) an ethylene vinyl acetate copolymer or (b) a three component blend of (1) from about 40% to about 60%, by weight, of a linear low density polyethylene, (2) from about 20% to about 30%, by weight of a linear medium density polyethylene and (3) from about 20%, by weight, to about 30%, by weight, of an ethylene vinyl aetate copolymer; two intermediate layers each consisting essentially of a linear low density polyethylene and two surface layers each consisting essentially of a four component blend of (1) from about 40% to about 60%, by weight, of a linear low density polyethylene, (2) from 20% to about 30%, by weight, linear medium density polyethylene, (3) from about 20% to about 30%, by weight, of an ethylene vinyl acetate copolymer and (4) from about 500-3,000 parts per million of one or more ultraviolet stabilizers. The most preferred embodiment of the present invention is a five layered film comprising a core layer which consists essentially of either (a) about 100%, by weight, of an ethylene vinyl acetate copolymer having from about 3.3% to about 4.1% vinyl acetate derived units and a density of from about 0.9232 to about 0.9250 grams per cubic centimeter or (b) a three component blend of (1) about 55%, by weight, of a linear low density polyethylene which is a copolymer of ethylene and octene having a density of about 0.920 grams per cubic centimeter, (2) about 28%, by weight, of a linear medium density polyethylene having a density of about 0.935 grams per cubic centimeter and (3) about 17%, by weight, of an ethylene vinyl acetate copolymer having from about 3.3% to about 4.1% vinyl acetate derived units and a density of from about 0.9232 to about 0.9250 grams per cubic centimeter; two intermediate layers each comprising about 100%, by weight, of linear low density polyethylene which is a copolymer of ethylene and octene having a density of about 0.920 grams per cubic centimeter and two surface layers each consisting essentially of a four component blend of (1) about 50%, by weight, of a linear low density polyethylene which is a copolymer of ethylene and octene having a density of about 0.920 grams per cubic centimeter, (2) about 25%, by weight, of a linear medium density polyethylene having a density of about 0.935 grams per cubic centimeter, (3) about 25%, by weight, of a ethylene vinyl acetate copolymer having from about 3.3% to about 4.1% vinyl acetate derived units and a density of from about 0.9232-0.9250 grams per cubic centimeter and (4) about 1,500 parts per million of a hindered amine ultraviolet light stabilizer.

Alternatively, a film especially useful in conventional packaging applications comprises a core layer comprising either (a) an etheylene vinyl acetate copolymer or (b) a three component blend of (1) a linear low density polyethylene, (2) a linear medium density polyethylene and (3) an ethylene vinyl acetate copolymer; two intermediate layers each comprising a linear low density polyethylene and two surface layers each comprising a three component blend of (1) a linear low density polyethylene, (2) a linear medium density polyethylene, and (3) an ethylene vinyl acetate copolymer. A preferred embodiment of the film comprises a core layer consisting essentially of either (a) an ethylene vinyl acetate copolymer or (b) a three component blend of (1) from about 40% to about 60%, by weight of a linear low density polyethylene, (2) from about 20% to about 30%, by weight of a linear medium density polyethylene and (3) from about 20%, by weight, to about 30%, by weight, of an ethylene vinyl acetate copolymer; two intermediate layers each consisting essentially of a linear low density polyethylene and two surface layers each consisting essentially of a three component blend of (1) from about 40% to about 60%, by weight, of a linear low density polyethylene, (2) from about 20% to about 30%, by weight, linear medium density polyethylene, and (3) from about 20% to about 30% by weight of an ethylene vinyl acetate copolymer. The most preferred embodiment of the packaging film is a five layered film comprising a core layer which consists essentially of either (a) about 100%, by weight of an ethylene vinyl acetate copolymer having from about 3.3% to about 4.1% vinyl acetate derived units and a density of from about 0.9232 to about 0.9250 grams per cubic centimeter or (b) a three component blend of (1) about 55%, by weight, of a linear low density polyethylene which is a copolymer of ethylene and octene having a density of about 0.920 grams per cubic centimeter, (2) about 28%, by weight of a linear medium density polyethylene having a density of about 0.935 grams per cubic centimeter and (3) about 17%, by weight, of an ethylene vinyl acetate copolymer having from about 3.3% to about 4.1% vinyl acetate derived units and a density of from about 0.9232 to about 0.9250 grams per cubic centimeter; two intermediate layers each comprising about 100% by weight of linear low density polyethylene which is a copolymer of ethylene and octene having a density of about 0.920 grams per cubic centimeter; and two surface layers each consisting essentially of a three component blend of (1) about 50%, by weight, of a linear low density polyethylene which is a copolymer of ethylene and octene having a density of about 0.920 grams per cubic centimeter, (2) about 25%, by weight, of a linear medium density polyethylene having a density of about 0.935 grams per cubic centimeter, and (3) about 25%, by weight, of an ethylene vinyl acetate copolymer having from about 3.3% to about 4.1% vinyl acetate derived units and a density from about 0.9232 to 0.9250 grams per cubic centimeter.

The film is both stretched, e.g. biaxially oriented, and cross-linked. Preferably the film is cross-linked by irradiation with from about 3.0 to about 8.0 MR. A more preferable degree of cross-linking is accomplished by irradiation of the film in the range of from about 5 to about 7 MR. The most preferable degree of cross-linking is accomplished by irradiation with about 6 MR.

In an alternate embodiment, in a film especially suited for conventional packaging applications, the film is cross-linked by irradiation with from about 1.0 to about 5.0 MR. A more preferable degree of cross-linking is accomplished by irradiation of the packaging film in the range of from about 2 to about 4 MR. The most preferable degree of cross-linking is accomplished by irradiation with about 3 MR of irradiation.

The degree of stretching to achieve the appropriate low degree of biaxial orientation and associated physical characteristics is preferably in the range of from about 3.0 to about 4.0 times the original dimensions in both the transverse (TD) and longitudinal (MD) directions. More preferably the degree of stretching is from about 3.0 to about 3.5 times the original dimensions in both the transverse and longitudinal directions. The most preferred degree of stretching, i.e. orientation, is approximately 3.3 times the original dimension in both the transverse and longitudinal directions.

Alternatively, in a shrinkable film especially useful in conventional packaging applications, the degree of stretching to achieve the appropriate biaxial orientation and associated physical characteristics is preferably in the range of from about 4.0 to about 6.0 times the original dimensions in both the transverse (TD) and longitudinal (MD) directions. More preferably the degree of stretching is from about 4.5 to about 5.5 times the original dimensions in both the transverse and longitudinal directions. The most preferred degree of stretching, i.e. orientation, is approximately 5.0 times the original dimension in both the transverse and longitudinal directions.

Preferably the thicknesses of the two skin layers are substantially equal to each other. The sum of the thicknesses of the two skin layers may preferably range from about 20% to about 60% of the total thickness of the film. More preferably the sum of the thicknesses of the two skin layers may range from about 38% to about 48% of the total thickness of the film. Most preferably the sum of the thicknesses of the two skin layers is about 43% of the total thickness of the film. That is, the thickness of each skin layer, most preferably, comprises about 21.5% of the total thickness of the film. Preferably the thicknesses of the two intermediate layers are substantially equal to each other. The sum of the thicknesses of the two intermediate layers may preferably range from about 20% to about 60% of the total thickness of the film. More preferably the sum of the thicknesses of the two intermediate layers may range from about 38% to about 48% of the total thickness of the film. Most preferably the sum of the thicknesses of the two intermediate layers is about 43% of the total thickness of the film. That is, the thickness of each intermediate layer most preferably comprises about 21.5% of the total thickness of the film. The thickness of the core layer preferably ranges from about 10% to about 30% of the total thickness of the film. More preferably the thickness of the core layer may range from about 12% to about 20% of the total thickness of the film. Most preferably the thickness of the core layer comprises about 14% of the total thickness of the film.

Preferably, the total thickness of the film may range from about 50 gauge to about 200 gauge. That is from about 0.50 mil to about 2.00 mil. More preferably the total thickness of the film may vary from about 50 to about 100 gauge. Most preferably the film thickness is about 75 gauge.

A colorant or dye may be added to any of the layers of the film. Preferably the colorant is only added to the intermediate and core layers. More preferably the colorant is added only to the core layer.

The multi-layer film may be combined with other polymeric materials for specific applications. For instance, additional layers may be added on either or both sides of the film to improve various physical characteristics.

BRIEF DESCRIPTION OF THE DRAWING

FIG. I is a cross-sectional view of a preferred five layered embodiment of the present invention.

DESCRIPTION OF THE PREFERRED EMBODIMENT

Referring to FIG. I, which is a cross-sectional view of a preferred five layered embodiment of the present invention, it is seen that this embodiment comprises a core layer 1, two intermediate layers 2 and 3 and two skin or surface layers 4 and 5. The preferred thickness ratio of the five layers of 21.5%/21.5%/14%/21.5%/21.5% is demonstrated in FIG. I. Preferred core layer 1 formulations comprise either (a) an ethylene vinyl acetate copolymer or (b) a three component blend of (1) a linear low density polyethylene, (2) a linear medium density polyethylene and (3) and ethylene vinyl acetate copolymer. Preferably, core layer 1 consists essentially of either (a) about 100%, by weight, of an ethylene vinyl acetate copolymer or (b) a three component blend of (1) from about 40% to 60%, by weight, of a linear low density polyethylene, (2) from about 20% to about 30%, by weight, of a linear medium density polyethylene and (3) from about 20% to about 30%, by weight, of an ethylene vinyl acetate copolymer. Most preferably the core layer 1 consists essentially of either (a) about 100%, by weight, of an ethylene vinyl acetate copolymer having from about 3.3% to about 4.1% vinyl acetate derived units and a density at 23° C. of from about 0.9232 to about 0.9250 grams per cubic centimeter or (b) a three component blend of (1) about 55%, by weight, of a linear low density polyethylene which is a copolymer of ethylene and octene and has a density at 23° C. of about 0.920 grams per cubic centimeter, (2) about 28%, by weight, of a linear medium density polyethylene having a density of 23° C. of about 0.935 grams per cubic centimeter and (3) about 25%, by weight of an ethylene vinyl acetate copolymer having from about 3.3% to about 4.1% vinyl acetate derived units and a density at 23° C. of from about 0.9232 to about 0.9250.

As an especially preferred ethylene vinyl acetate copolymer which can be utilized in formulating the core layer 1 (as either the primary constituent thereof [one embodiment] or as a component in the three component blend [second embodiment] both embodiments discussed above) may be obtained from the El Paso Polyolefins Company under the trade designation El Paso PE 204CS95. This material has a density at 23° C. of from about 0.9232 to about 0.9250 grams per cubic centimeter and a melt flow (measured by ASTM D 1238, condition E-28) of about 2.0±0.5 grams per ten (10) minutes. This material contains from about 3.3 to about 4.1% vinyl acetate derived units. The nominal percent of vinyl acetate derived units present in the material is about 3.6%. Other ethylene vinyl acetate copolymers or blends of two or more ethylene vinyl acetate copolymers may be utilized in either embodiment of the core layer 1 of the present invention. In particular, ethylene vinyl acetate copolymers comprising from about 2%, by weight, to about 18%, by weight, vinyl acetate derived units may be utilized. Preferably the ethylene vinyl acetate copolymer will comprise from about 2%, by weight, to about 10%, by weight, of vinyl acetate derived units. Even more preferably the ethylene vinyl acetate copolymer will comprise from about 2%, by weight, to about 5%, by weight, of vinyl acetate derived units.

With regard to the three component blend embodiment of core layer 1, an especially preferred linear low density polyethylene may be obtained from the Dow Chemical Company under the trade designation Dowlex 2045. This material is a copolymer of ethylene and octene and has a density at 23° C. of about 0.920 grams per cubic centimeter and a melt flow index (measured by ASTM-D-1238, E-28) of from about 0.7 to about 1.2 grams per ten minutes. Other linear low density polyethylene materials or blends of two or more linear low density polyethylene materials may be utilized as the linear low density polyethylene constituent of the three blend component embodiment of core layer 1.

Preferably, the linear medium density polyethylene utilized in the three component blend embodiment of core layer 1 has a density at 23° C. of from about 0.933 to about 0.937 grams per cubic centimeter. More preferably the linear medium density polyethylene material has a density at 23° C. of about 0.935 grams per cubic centimeter. A preferred linear medium density polyethylene material for utilization in the core layer blend formulation may be obtained from the Dow Chemical Company under the trade designation Dowlex 2037. This material is a copolymer of ethylene and octene and has a density at 23° C. of about 0.935 grams per cubic centimeter and a flow rate (measured by ASTM-D-1238, condition E-28) of 2.55±0.35 grams per ten (10) minutes. Other linear medium density polyethylene materials or blends of two or more linear medium density polyethylene materials may be utilized as the linear medium density polyethylene constituent of the three component blend embodiment of core layer 1.

Intermediate layers 2 and 3 each comprise one or more linear low density polyethylenes. A preferred linear low density polyethylene material which may be utilized in both of intermediate layers 2 and 3 may be obtained from the Dow Chemical Company under the trade designation Dowlex 2045. This material is a copolymer of ethylene and octene and has a density at 23° C. of about 0.920 grams per cubic centimeter and a melt flow index (ASTM-D-1238, E-28) of from about 0.7 to about 1.2 grams per ten (10) minutes. Other linear low density polyethylenes or blends of two or more linear low density polyethylene materials may be utilized to formulate intermediate layers 2 and 3.

Returning to FIG. I, and in particular, to surface layers 4 and 5 experimentation has determined that a preferred surface layer formulation should comprise a four component blend of (1) a linear low density polyethylene material, (2) a linear medium density polyethylene material, (3) an ethylene vinyl acetate copolymer and (4) one or more ultraviolet light stabilizers. Alternatively, a heat shrinkable film especially useful in conventional packaging applications should include surface layers 4 and 5 comprising a three component blend of (1) a linear low density polyethylene material, (2) a linear medium density polyethylene material, and (3) an ethylene vinyl acetate copolymer.

Preferably the formulation of each of the two skin layers 4 and 5 comprises a four component blend of (1) from about 40% to about 60%, by weight, of a linear low density polethylene material (2) from about 20% to about 30%, by weight, of a linear medium density polyethylene material, (3) from about 20% to about 30%, by weight, of an ethylene vinyl acette copolymer and (4) one or more ultraviolet light stabilizers.Even more preferably the surface layers of the film should comprise a four component blend of (1) from about 45% to about 55%, by weight, of a linear low density polyethylene material, (2) from about 23% to about 27%, by weight, of a linear medium density polyethylene material, (3) from about 23% to about 27%, by weight, of an ethylene vinyl acetate copolymer and (4) one or more ultraviolet stabilizers. The most preferred skin or surface layer formulation of the present invention consists essentially of a four component blend of (1) about 50%, by weight, of a linear low density polyethylene material, (2) about 25%, by weight, of a linear medium density polyethylene material, (3) about 25%, by weight, of an ethylene vinyl acetate copolymer and (4) one or more hindered amine ultraviolet stabilizers.

The same linear low density polyethylene resins which were discussed with regard to the three component blend embodiment of core layer 1 and intermediate layers 2 and 3 may be utilized as the linear low density polyethylene constituent of the skin layers 4 and 5.

However, the linear low density polyethylene material used in the skin layers does not have to be the material used in the core layer or intermediate layers. Accordingly, the film may comprise a first linear low density polyethylene material as a core layer constituent a second, different, linear low density polyethylene material as an intermediate layer constituent and yet a third, different, linear low density polyethylene material as a constituent of the skin layers. Blends of one or more linear low density polyethylene materials may comprise any linear low density polyethylene constituent present in any layer. A preferred linear low density polyethylene for utilization in the skin layers 4 and 5 is Dowlex 2045, described in detail above. Preferably, the linear medium density polyethylene of the skin layer has a density at 23° C. of from about 0.933 to about 0.937 grams per cubic centimeter. More preferably the linear medium density polyethylene material has a density at 23° C. of about 0.935 grams per cubic centimeter. A preferred linear medium density polyethylene material for utilization in the surface layer formulation may be obtained from the Dow Chemical Company under the trade designation Dowlex 2037. This material is a copolymer of ethylene and octene and has a density at 23° C. of about 0.935 grams per cubic centimeter and a flow rate (measured by ASTM-D-1238, condition E-28) of 2.55±0.35 grams per ten (10) minutes. Other linear low density polyethylene materials or blends of two or more linear low density polyethylene materials may be utilized as the linear low density polyethylene constituent of skin layers 4 and 5.

Ethylene vinyl acetae copolymers comprising from about 2%, by weight, to about 18%, by weight, vinyl acetate derived units may be utilized as the ethylene vinyl acetate component of skin layers 4 and 5. Preferably the ethylene vinyl acetate copolymer will comprise from about 2%, by weight, to about 10%, by weight, of vinyl acetate derived units. Even more preferably the ethylene vinyl acetate copolymer will comprise from about 2%, by weight, to about 5%, by weight, of vinyl acetate derived units. The most preferred ethylene vinyl acetate copolymer for utilization in the surface layer formulation may be obtained from the El Paso Polyolefins Company. This material has a density at 23° C. of from 0.9232 to about 0.9250 grams per cubic centimeter and a melt flow (measure by ASTM D 1238, condition E-28) of about 2.0±0.5 grams per ten (10) minutes. The material contains from about 3.3 to about 4.1% vinyl acetate derived units. The nominal percent of vinyl acetate derived units present in the material is about 3.6%. Blends of two or more of these ethylene vinyl acetate copolymers may be utilized as the ethylene vinyl acetate copolymer constituent of skin layers 4 and 5. Other ethylene vinyl acetate copolymers or blends thereof may also be utilized as the ethylene vinyl acetate component of layers 4 and 5.

A preferred ultraviolet light stabilizer for utilization in skin layers 4 and 5 may be obtained from Ciba-Geigy under the trade designation TINUVIN® 622. This material is a polymeric hindered amine, which is believed to have a molecular weight in excess of 2000 and a melting range of 130°–145° C. Published solubility data (grams per 100 grams of solution at 20° C.) for this material are: acetone 2, benzene 30, chloroform 40, ethyl acetate 5, hexane 0.01, methanol 0.1, methylene chloride 40, water 0.01, xylene 8. Preferably both surface layers comprise from about 500 ppm (parts per million) to about 3,000 ppm of the ultraviolet light stabilizer. More preferably both layers comprise from about 1,000 to about 2,000 ppm of the light stabilizer. Most preferably both surface layers comprise about 1,500 ppm of the light stabilizer. Blends of two or more hindered amine ultraviolet light stabilizers may be utilized as the ultraviolet light stabilizer constituent of skin layers 4 and 5. Other ultraviolet light stabilizers or blends of one or more other ultraviolet stabilizers may be utilized.

Preferably the composition and other parameters of intermediate layers 2 and 3 are substantially the same. However, different linear low density polyethylenes may be utilized in each intermediate layer.

Preferably the composition and other parameters of skin layers 4 and 5 are substantially the same. However, different linear low density polyethylene, linear medium density polyethylene, ethylene vinyl acetate copolymers and ultraviolet stabilizers or blends thereof may be utilized for each skin layer.

Optionally a colorant or dye may be incorporated into all layers of the film. Preferably the dye is incorporated only into the core layer and intermediate layers. More preferably the dye is incorporated only into core layer 1. Incorporating the dye into the interior layers of the film reduces the possibility of the dye migrating to the surface of the film. The presence of the colorant reduces light transmission into the room or other area that is enclosed by the storm window. This features reduces cooling requirements in warm climates. The option also may reduce glare from sunlight entering the room. Appropriate dyes/colorants are well known and available to those of skill in the art. In food packaging situations FDA and/or USDA approved materials should be used.

Preferably the thicknesses of the two skin layers are substantially equal to each other. The sum of the thicknesses of the two skin layers may preferably range from about 20% to about 60% of the total thickness of the film. More preferably the sum of the thicknesses of the two skin layers may range from about 38% to about 48% of the total thickness of the film. Most preferably the sum of the thicknesses of the two skin layers is about 43% of the total thickness of the film. That is, the thickness of each skin layer, most preferably, comprises about 21.5% of the total thickness of the film. Preferably the thicknesses of the two intermediate layers are substantially equal to each other. The sum of the thicknesses of the two intermediate layers may preferably range from about 20% to about 60% of the total thickness of the film. More preferably the sum of the thicknesses of the two intermediate layers may range from about 38% to about 48% of the total thickness of the film. Most preferably the sum of the thicknesses of the two intermediate layers is about 43% of the total thickness of the film. That is, the thickness of each intermediate layer most preferably comprises about 21.5% of the total thickness of the film. The thickness of the core layer preferably ranges from about 10% to about 30% of the total thickness of the film. More preferably the thickness of the core layer may range from about 12% to about 20% of the total thickness of the film. Most preferably the thickness of the core layer comprises about 14% of the total thickness of the film.

Preferably, the total thickness of the film may range from about 50 gauge to about 200 gauge. That is from about 0.50 mil to about 2.00 mil. More preferably the total thickness of the film may vary from about 50 to about 100 gauge. Most preferably the film thickness is about 75 gauge.

Those skilled in the art will readily recognize that all of the by weight percentages disclosed herein are subject to slight variation. Additionally, these percentages may vary slightly as a result of the inclusion or application of additives to the surface layers such as the silicone mist discussed above or inclusion therein of agents such as slip, antioxidant and anti-block agents. A preferred anti-block agent is a diatomaceous silica, $SiO_2$, which is available from McCullough & Benton, Inc. under the tradename Superfine Superfloss. This material has a wet density of about 29.0 lbs/ft$^3$, a specific gravity of about 2.30 and a pH of about 9.5. Other well known antiblock agents may be utilized. A preferred slip agent is Erucamide (available from Humko Chemical under the tradename Kenamide E). This material is believed to have an average molecular weight of about 335 and a melting point range of from about 72° C. to about 86° C. Other slip agents such as Stearamide (available from the Humko Chemical Company under the tradename Kemamide S) and N,N-'-Dioleoylethylenediamine (available from Glyco Chemical under the tradename Acrawax C) may be utilized. A preferred silicone spray for application to the inner surface of the extruded tube is a liquid polyorganosiloxane manufactured by General Electric under the trade designation General Electric SF18 polydimethylsiloxane. A preferred antioxidant and thermal stabilizing agent is tetrakis[methylene 3-(3',5'-di-t-butyl-4'-hydroxyphenyl)-propionate]methane. This material is believed to be a symmetrical molecule which includes four sterically hindered phenolic hydroxyl groups and has a molecular weight of about 1178. This material is available from by Ciba-Geigy under the trade designation Irganox ® 1010.

The general ranges for inclusion of these agents into the surface layers 4 and 5 and, in the case of the silicone spray, the application of the spray mist onto the interior surface layer of a tubular extrudate are as follows:

(1) Anti-Block agent:
2000–4000 ppm, preferably
2500–3500 ppm, more preferably
about 3000 ppm, most preferably
(2) Slip Agent:
1000–2000 ppm, preferably
1250–1750 more preferably
about 1500 ppm most preferably
(b 3) Polydimethylsiloxane: 0.5 mg.ft$^2$-and up
(4) Antioxidant:
100–500 ppm, preferably
200–400 ppm, more preferably
about 300 ppm, most preferably When utilized within the specification and claims of the present application the term "consisting essentially of" is not meant to exclude slight percentage variations or additives and agents of this sort.

Additional layers and/or minor amounts of various additives of the types described above may be added to the film structure of the present invention as desired but care must be taken not to adversely affect the desired physical properties and other characteristics of the inventive film. It should also be recognized that many resins obtained from their manufacturer already contain small amounts of additives of different types.

In the preferred process for making the multi-layer film of the present invention the basic steps are coextruding the layers to form a multilayer film, irradiating the film, and then stretching the film to biaxially orient. These steps and additional desirable steps will be explained in detail in the paragraphs which follow.

The process begins by blending, as necessary, the raw materials (i.e. polymeric resins) in the proportions and ranges desired as discussed above. The resins are usually purchased from a supplier in pellet form and can be blended in any one of a number of commercially available blenders as is well known in the art. During the blending process any additives and/or agents which are desired to be utilized are also incorporated. The additives may be incorporated into the blend by utilizing a masterbatch containing small percentages of the additives. For example, in the preferred embodiment of the present invention the light stabilizer and antioxidant are added to the blend which will form the surface layers by blending in a masterbatch available from Ampacet under the trade designation 10478. This material comprises a three component blend of (1) about 88%, by weight, conventional low density polyethylene having a density of about 0.918–0.922 grams per cubic centimeter and a melt index of from about 6 to about 10 grams per ten minutes, (2) about 10%, by weight, of hindered amine light stabilizer (TINUVIN ® 662) and (3) about 2%, by weight, of antioxidant (Irganox ® 1010).

The resins and applicable additives and/or agents are then fed to the hoppers of extruders which feed a coextrusion die. For the preferred palindromic five layer film, wherein the two intermediate layers are substantially identical to each other and the two surface layers are substantially identical to each other, at least three extruders need to be employed. One for the two substantially identical skin or surface layers, one for the two substantially identical intermediate layers and one for the core layer. Additional extruders may be employed if a film having non-identical (e.g. non-palindromic film) intermediate and/or surface layers is desired. The materials are coextruded as a relatively thick tube or "tape" which has an initial diameter and thickness dependent upon the diameter and die gap of the coextrusion die. The final diameter and thickness of the tubular film is dependent upon the racking ratio, e.g. the stretching ratio. Circular coextrusion dies are well known to those in the art and can be purchased from a number of manufacturers. As an alternative to tubular coextrusion, slot dies could be used to coextrude the material in sheet form. Well known single or multi-layer extrusion coating processes could also be utilized, if desired.

An additional process step which should be utilized to manufacture the preferred embodiment of the presently inventive film is to irradiate the tape or unexpanded tubing or sheet by bombarding it with high-energy electrons from an accelerator to cross-link the materials of the tube. Cross-linking increases the structural strength of the film and/or the force at which the material can be stretched before tearing apart when the film materials are predominately ethylene such as conventional and/or linear polyethylene (low, medium and high density) and/or copolymers of ethylene such as, for example, ethylene vinyl acetate. Irradiation may also improve the optical properties of the film and change the properties of the film at higher temperatures. A preferred irradiation dosage level is in the range of from about 3.0 MR to about 8.0 MR. An even more preferred range is from about 5.0 MR to about 7.0 MR. The most preferred dosage level is approximately 6.0 MR.

Following coextrusion, quenching to cool and solidify, and irradiation of the tape, the extruded tubular tape is reheated to its orientation temperature range and inflated, by application of internal air pressure, into a bubble thereby transforming the narrow tubular tape with thick walls into a wide tubular film with thin walls of the desired film thickness and width. This process is sometimes referred to as the "trapped bubble technique" of orientation or as "racking". The degree of inflation and subsequent stretching is often referred to as the "racking ratio" or "stretching ratio". For example, a transverse racking or stretching ratio of 2.0 would mean that the film had been stretched 2.0 times its original extruded size in the transverse direction during transverse racking. After stretching, the tubular film is then collapsed into a superimposed lay-flat configuration and wound into rolls often referred to as "mill rolls". The racking process orients the film by stretching it transversely and, to some extent, longitudinally and thus imparts shrink capabilities to the film. Additional longitudinal or machine direction racking or stretching may be accomplished by revolving the deflate rollers which aid in the collapsing of the "blown bubble" at a greater speed than that of the rollers which serve to transport the reheated "tape" to the racking or blown bubble area. These methods of racking are well known to those of skill in the art. Preferred transverse and longitudinal stretching ratios of the present film range from about 3.0 transverse by about 3.0 longitudinal to about 4.0 transverse by about 4.0 longitudinal. That is, preferably, the film is stretched between about 3.0 and 4.0 times its original dimensions in both the transverse and longitudinal directions. More preferably the film is stretched between 3.0 and 3.5 times its original dimensions in both the transverse (TD) and longitudinal (LD) directions. A particularly preferred stretching ratio is about 3.3 transverse by about 3.3 longitudinal. That is, the particularly preferred film is stretched about 3.3 times its original dimensions in both the transverse and longitudinal directions.

For a film especially useful in conventional packaging applications, preferred transverse and longitudinal stretching ratios of the present film range from about 4.0 transverse by about 4.0 longitudinal to about 6.0 transverse by about 6.0 longitudinal. That is, preferably, a film is stretched between about 4.0 and 6.0 times its original dimensions in both the longitudinal and transverse directions. More preferably the film is stretched between 4.5 and 5.5 times its original dimensions in both the transverse (TD) and longitudinal (MD) directions. A particularly preferred stretching ratio is about 5.0 transverse by about 5.0 longitudinal. That is, the particularly preferred packaging film is stretched about 5.0 times its original dimensions in both the transverse and longitudinal directions.

To further disclose and clarify the scope of the present invention to those skilled in the art the following test data are presented.

Two embodiments of the present invention were formed by coextrusion, irradiated and stretched (oriented) by application of internal air (bubble technique) in accordance with the teachings described above. These embodiments were five layered films irradiated with approximately 5-6 MR (10 MA-milliamps) and had an approximate layer thickness ratio if 1.5/1.5/1/1.5/1.5. Embodiment Y comprised an approximate layer structure of "50%, by weight, A+25%, by weight, B+25%, by weight, C+1,500 ppm D/100%, by weight, A/100%, by weight, C/100%, by weight, A/50%, by weight, A+25%, by weight, B+25%, by weight, C+1,500 ppm D". Embodiment X comprised an approximate layer structure of "50%, by weight, A+25%, by weight, B+25%, by weight C+1,500 ppm D/100%, by weight, A/55.6%, by weight, A+27.6%, by weight, B+16.8%, by weight, C/100%, by weight, A/50%, by weight, A+25%, by weight, B+25%, by weight, C+1,500 ppm D". These two 60 gauge embodiments were compared to a 75 gauge three layer storm window structure (discussed in Application Ser. No. 609,067 filed May 10, 1984, hereby incorporated by reference) having an approximate layer structure of "50%, by weight, A+25%, by weight, B+25%, by weight, C+1,500 ppm D/100%, by weight, A/50%, by weight, A+25%, by weight B+25%, by weight C+1,500 ppm D" and a prior art linear medium density polyethylene monolayer structure (discussed above). "A" represents a linear low density polyethylene having a density of about 0.920 gm/cm$^3$ (Dowlex 2045). "B" having a linear medium density polyethylene having a density of about 0.935 gm/cm$^3$ (Dowlex 2037). "C" represents an ethylene vinyl acetate copolymer having from about 3.3% to about 4.1% vinyl acetate derived units and a density of from about 0.9232–0.9250 g/cm$^3$ (El Paso PE 204CS95). "D" represents a hindered amine stabilizer (TINUVIN ® 622).

Test results for these films are listed below in Table I.

TABLE I

|  | PRESENT MULTILAYER FILM-Y | PRESENT MULTILAYER FILM-X | COMPARISON THREE LAYER FILM | PRIOR ART MONOLAYER FILM |
| --- | --- | --- | --- | --- |
| Approximate Gauge[0] | 60 | 60 | 75 | 90 |
| Approximate Racking Ratio | 3.1 MD × 3.4 TD | 3.2 MD × 3.4 TD | 3.0 MD × 3.0 TD | 4.8 MD × 4.5 TD |
| Tensile At Break And 73° F. (PSI)[1] | | | | |
| Av.[2] Long. | 133.1 × 100 | 175.6 × 100 | 135.7 × 100 | 204.5 × 100 |
| Std. Dev. | 5.6 × 100 | 12.1 × 100 | 16.6 × 100 | 3.7 × 100 |
| 95% C.L.[3] | 8.9 × 100 | 19.2 × 100 | 26.5 × 100 | 5.9 × 100 |
| Av. Trans. | 197.0 × 100 | 172.3 × 100 | 128.3 × 100 | 207.5 × 100 |
| Std. Dev. | 24.0 × 100 | 8.5 × 100 | 17.4 × 100 | 11.7 × 100 |
| 95% C.L. | 38.1 × 100 | 13.6 × 100 | 27.6 × 100 | 18.5 × 100 |
| Elongation At Break And 73° F. (%)[4] | | | | |
| Av. Long. | 168 | 222 | 221 | 170 |
| Std. Dev. | 7 | 11 | 20 | 2 |
| 95% C.L. | 11 | 18 | 32 | 3 |
| Av. Trans. | 128 | 205 | 226 | 112 |

TABLE I-continued

| | PRESENT MULTILAYER FILM-Y | PRESENT MULTILAYER FILM-X | COMPARISON THREE LAYER FILM | PRIOR ART MONOLAYER FILM |
|---|---|---|---|---|
| Std. Dev. | 25 | 12 | 12 | 11 |
| 95% C.L. | 39 | 19 | 20 | 17 |
| Modulus At 73° F. (PSI)[5] | | | | |
| Av. Long. | 27.4 × 1000 | 30.8 × 1000 | 22.3 × 1000 | — |
| Std. Dev. | 0.7 × 1000 | 1.7 × 1000 | 2.2 × 1000 | — |
| 95% C.L. | 1.1 × 1000 | 2.8 × 1000 | 3.5 × 1000 | — |
| Av. Trans. | 32.5 × 1000 | 33.8 × 1000 | 26.1 × 1000 | — |
| Std. Dev. | 1.4 × 1000 | 3.4 × 1000 | 0.9 × 1000 | — |
| 95% C.L. | 2.2 × 1000 | 5.4 × 1000 | 1.4 × 1000 | — |
| Tear Propagation At 73° F. (grams)[6] | | | | |
| Av. Long. | 7.20 | 6.85 | 29.13 | 13.38 |
| Std. Dev. | 0.85 | 0.34 | 6.25 | 0.32 |
| 95% C.L. | 1.35 | 0.54 | 9.94 | 0.51 |
| Av. Trans. | 4.80 | 6.75 | 30.38 | 13.31 |
| Std. Dev. | 1.10 | 0.68 | 15.28 | 2.25 |
| 95% C.L. | 1.74 | 1.08 | 24.31 | 3.56 |
| Ball Burst Impact At 73° F. 1.00 In. Diam. Sphere Hd. (cm × kg)[7] | | | | |
| Average | 12.9 | 14.2 | 37.3 | 23.6 |
| Std. Dev. | 0.8 | 1.3 | 3.4 | 2.7 |
| 95% C.L. | 1.3 | 2.0 | 5.4 | 4.3 |
| Optical Properties At 73° F. | | | | |
| Haze (%)[8] | | | | |
| Avg. | 2.4 | 2.8 | 3.9 | 1.6 |
| Std. Dev. | 0.2 | 0.3 | 0.7 | 0.2 |
| 95% C.L. | 0.3 | 0.5 | 1.1 | 0.3 |
| Gloss (45°)[9] | | | | |
| Avg. | 89 | 87 | 82 | 93.3[9a] |
| Std. Dev. | 2 | 2 | 4 | 1.0 |
| 95% C.L. | 3 | 3 | 6 | 1.5 |
| Tensile At 20 In./Min. And 73° F. (PSI)[10] | | | | |
| 5% Elongation | | | | |
| Av. Long. | 16.0 × 100 | 17.5 × 100 | 13.5 × 100 | — |
| Std. Dev. | 1.4 × 100 | 1.7 × 100 | 1.3 × 100 | — |
| 95% C.L. | 2.2 × 100 | 2.7 × 1000 | 2.0 × 100 | — |
| Av. Trans. | 19.2 × 100 | 18.4 × 100 | 13.7 × 100 | — |
| Std. Dev. | 1.7 × 100 | 1.2 × 100 | 1.5 × 100 | — |
| 95% C.L. | 2.7 × 100 | 1.9 × 100 | 2.4 × 100 | — |
| 10% Elongation | | | | |
| Av. Long. | 24.1 × 100 | 25.5 × 100 | 22.1 × 100 | — |
| Std. Dev. | 1.2 × 100 | 1.4 × 100 | 1.4 × 100 | — |
| 95% C.L. | 2.0 × 100 | 2.2 × 100 | 2.2 × 100 | — |
| Av. Trans. | 27.8 × 100 | 27.1 × 100 | 20.1 × 100 | — |
| Std. Dev. | 2.5 × 100 | 1.2 × 100 | 1.0 × 100 | — |
| 95% C.L. | 3.9 × 100 | 1.9 × 100 | 2.8 × 100 | — |
| 15% Elongation | | | | |
| Av. Long. | 29.1 × 100 | 31.4 × 100 | 29.0 × 100 | — |
| Std. Dev. | 1.7 × 100 | 0.8 × 100 | 1.9 × 100 | — |
| 95% C.L. | 2.7 × 100 | 1.3 × 100 | 3.1 × 100 | — |
| Av. Trans. | 35.0 × 100 | 35.5 × 100 | 24.0 × 100 | — |
| Std. Dev. | 3.1 × 100 | 2.7 × 100 | 2.2 × 100 | — |
| 95% C.L. | 5.0 × 100 | 4.3 × 100 | 3.5 × 100 | — |
| 20% Elongation | | | | |
| Av. Long. | 32.8 × 100 | 35.4 × 100 | 34.4 × 100 | — |
| Std. Dev. | 1.7 × 100 | 1.1 × 100 | 1.9 × 100 | — |
| 95% C.L. | 2.7 × 100 | 1.7 × 100 | 3.0 × 100 | — |
| Av. Trans. | 40.9 × 100 | 41.6 × 100 | 26.7 × 100 | — |
| Std. Dev. | 4.4 × 100 | 5.8 × 100 | 2.2 × 100 | — |
| 95% C.L. | 7.0 × 100 | 5.8 × 100 | 3.5 × 100 | — |
| 25% Elongation | | | | |
| Av. Long. | 35.8 × 100 | 38.1 × 100 | 38.0 × 100 | — |
| Std. Dev. | 1.8 × 100 | 0.7 × 100 | 2.2 × 100 | — |
| 95% C.L. | 2.9 × 100 | 1.1 × 100 | 3.5 × 100 | — |
| Av. Trans. | 46.3 × 100 | 48.1 × 100 | 29.6 × 100 | — |
| Std. Dev. | 5.3 × 100 | 4.4 × 100 | 2.7 × 100 | — |
| 95% C.L. | 8.5 × 100 | 7.0 × 100 | 4.3 × 100 | — |
| Shrink Properties At 200° F. | | | | |

TABLE I-continued

|  | PRESENT MULTILAYER FILM-Y | PRESENT MULTILAYER FILM-X | COMPARISON THREE LAYER FILM | PRIOR ART MONOLAYER FILM |
|---|---|---|---|---|
| Free Shrink (%)[11] | | | | |
| Av. Long. | 17 | 18 | 29 | 2 |
| Std. Dev. | 2 | 2 | 2 | 1 |
| 95% C.L. | 3 | 3 | 3 | 2 |
| Av. Trans. | 27 | 26 | 30 | 11 |
| Std. Dev. | 2 | 1 | 2 | 1 |
| 95% C.L. | 3 | 1 | 3 | 1 |
| Shrink Force (lbs.)[12] | | | | |
| Av. Long. | 0.223 | 0.226 | 0.439 | 0.028 |
| Std. Dev. | 0.017 | 0.009 | 0.084 | 0.010 |
| 95% C.L. | 0.027 | 0.015 | 0.133 | 0.015 |
| Av. Trans. | 0.433 | 0.368 | 0.425 | 0.496 |
| Std. Dev. | 0.018 | 0.009 | 0.018 | 0.023 |
| 95% C.L. | 0.029 | 0.014 | 0.018 | 0.036 |
| Shrink Tension (PSI)[13] | | | | |
| Av. Long. | 274 | 307 | 381 | 29 |
| Std. Dev. | 26 | 14 | 30 | 11 |
| 95% C.L. | 42 | 22 | 48 | 17 |
| Av. Trans. | 431 | 508 | 404 | 494 |
| Std. Dev. | 8 | 7 | 43 | 33 |
| 95% C.L. | 12 | 10 | 68 | 52 |

An alternate embodiment was formed by coextrusion, stretched (oriented) by application of internal air (bubble technique) in accordance with the teachings described above. This embodiment was a five layer film and had an approximate layer thickness ratio of 2/1.5/1/1.5/2. The approximate layer structure of this embodiment comprised 50%, by weight, A plus 25%, by weight, B plus 25%, by weight, C/100%, by weight, A/100%, by weight, C/100%, by weight, A/50%, by weight, A plus 25%, by weight, B plus 25%, by weight, C. This embodiment Z has a thickness of 60 gauge. Test results for this film, particularly suited for packaging applications, is listed below in Table II. The multilayer film was irradiated, with an estimated irradiation of about 2.5 MR based on the flow rate data as shown in Table II below. The physical properties of the alternate embodiment, shown in Table II, are compared with a three layer film like that of the three layer of Table I but without the presence of UV stabilizer, and with a racking ratio of 5.2 MD by 4.8 TD.

TABLE II

|  | PRESENT MULTILAYER FILM-Z | COMPARISON THREE LAYER FILM |
|---|---|---|
| Approximate Gauge[0] | 60 | 60 |
| Approximate Racking Ratio | 5.2 MD × 4.8 TD | 5.2 MD × 4.8 TD |
| Tensile At Break And 73° F. (PSI)[1] | | |
| Av.[2] Long. | 147.5 × 100 | 165.2 × 100 |
| Std. Dev. | 9.6 × 100 | 10.7 × 100 |
| 95% C.L.[3] | 15.2 × 100 | 17.0 × 100 |
| Av. Trans. | 157.3 × 100 | 197.5 × 100 |
| Std. Dev. | 14.0 × 100 | 11.2 × 100 |
| 95% C.L. | 22.2 × 100 | 17.8 × 100 |
| Elongation At Break And 73° F. (%)[4] | | |
| Av. Long. | 122 | 113 |
| Std. Dev. | 6 | 6 |
| 95% C.L. | 10 | 10 |
| Av. Trans. | 108 | 111 |
| Std. Dev. | 13 | 6 |
| 95% C.L. | 20 | 9 |
| Modulus At 73° F. (PSI)[5] | | |
| Av. Long. | 52.7 × 1000 | 49.9 × 1000 |
| Std. Dev. | 1.7 × 10000 | 4.0 × 1000 |
| 95% C.L. | 2.6 × 1000 | 6.4 × 1000 |
| Av. Trans. | 56.1 × 1000 | 49.5 × 1000 |
| Std. Dev. | 1.4 × 1000 | 0.8 × 1000 |
| 95% C.L. | 2.2 × 1000 | 1.3 × 1000 |
| Tear Propagation At 73° F. (grams)[6] | | |
| Av. Long. | 5.35 | 5.10 |
| Std. Dev. | 0.50 | 0.38 |
| 95% C.L. | 0.80 | 0.61 |
| Av. Trans. | 5.35 | 7.65 |
| Std. Dev. | 1.12 | 1.03 |
| 95% C.L. | 1.79 | 1.65 |
| Ball Burst Impact At 73° F. 1.00 In. Diam. Sphere Hd. (cm × kg)[7] | | |
| Average | 19.3 | 18.5 |
| Std. Dev. | 2.3 | 1.5 |
| 95% C.L. | 3.6 | 2.3 |
| Optical Properties At 73° F. | | |
| Haze (%)[8] | | |
| Avg. | 2.2 | 1.9 |
| Std. Dev. | 0.3 | 0.3 |
| 95% C.L. | 0.5 | 0.6 |
| Gloss (45°)[9] | | |
| Avg. | 92 | 91 |
| Std. Dev. | 2 | 2 |
| 95% C.L. | 2 | 3 |
| Shrink Properties At 200° F. | | |
| Free Shrink (%)[11] | | |
| Av. Long. | 13 | 13 |
| Std. Dev. | 1 | 2 |
| 95% C.L. | 2 | 3 |
| Av. Trans. | 19 | 18 |
| Std. Dev. | 1 | 1 |
| 95% C.L. | 1 | 1 |
| Shrink Force (lbs.)[12] | | |
| Av. Long. | 0.203 | 0.221 |
| Std. Dev. | 0.018 | 0.024 |
| 95% C.L. | 0.028 | 0.038 |
| Av. Trans. | 0.316 | 0.324 |
| Std. Dev. | 0.009 | 0.011 |
| 95% C.L. | 0.014 | 0.018 |
| Shrink Tension (PSI)[13] | | |
| Av. Long. | 278 | 291 |

TABLE II-continued

| | PRESENT MULTILAYER FILM-Z | COMPARISON THREE LAYER FILM |
|---|---|---|
| Std. Dev. | 15 | 11 |
| 95% C.L. | 24 | 17 |
| Av. Trans. | 455 | 455 |
| Std. Dev. | 15 | 9 |
| 95% C.L. | 23 | 15 |
| Shrink Properties At 220° F. | | |
| Free Shrink (%)[11] | | |
| Av. Long. | 23 | 21 |
| Std. Dev. | 1 | 2 |
| 95% C.L. | 1 | 4 |
| Av. Trans. | 34 | 29 |
| Std. Dev. | 1 | 2 |
| 95% C.L. | 1 | 3 |
| Shrink Force (lbs.)[12] | | |
| Av. Long. | 0.249 | 0.253 |
| Std. Dev. | 0.023 | 0.020 |
| 95% C.L. | 0.036 | 0.032 |
| Av. Trans. | 0.359 | 0.369 |
| Std. Dev. | 0.003 | 0.005 |
| 95% C.L. | 0.004 | 0.008 |
| Shrink Tension (PSI)[13] | | |
| Av. Long. | 339 | 350 |
| Std. Dev. | 17 | 11 |
| 95% C.L. | 26 | 18 |
| Av. Trans. | 537 | 504 |
| Std. Dev. | 7 | 6 |
| 95% C.L. | 11 | 9 |
| Shrink Porperties At 240° F. | | |
| Free Shrink (%)[11] | | |
| Av. Long. | 50 | 54 |
| Std. Dev. | 4 | 2 |
| 95% C.L. | 6 | 3 |
| Av. Trans. | 58 | 57 |
| Std. Dev. | 1 | 1 |
| 95% C.L. | 1 | 1 |
| Shrink Force (lbs.)[12] | | |
| Av. Long. | 0.265 | 0.245 |
| Std. Dev. | 0.010 | 0.008 |
| 95% C.L. | 0.016 | 0.013 |
| Av. Trans. | 0.354 | 0.360 |
| Std. Dev. | 0.013 | 0.008 |
| 95% C.L. | 0.020 | 0.013 |
| Shrink Tension (PSI)[13] | | |
| Av. Long. | 370 | 392 |
| Std. Dev. | 8 | 6 |
| 95% C.L. | 13 | 10 |
| Av. Trans. | 500 | 567 |
| Std. Dev. | 19 | 15 |
| 95% C.L. | 30 | 23 |
| Shrink Properties At 260° F. | | |
| Free Shrink (%)[11] | | |
| Av. Long. | 78 | 78 |
| Std. Dev. | 1 | 1 |
| 95% C.L. | 1 | 1 |
| Av. Trans. | 79 | 77 |
| Std. Dev. | 1 | 1 |
| 95% C.L. | 2 | 2 |
| Shrink Force (Lbs.)[12] | | |
| Av. Long. | 0.245 | 0.264 |
| Std. Dev. | 0.032 | 0.035 |
| 95% C.L. | 0.051 | 0.056 |
| Av. Trans. | 0.355 | 0.310 |
| Std. Dev. | 0.017 | 0.014 |
| 95% C.L. | 0.027 | 0.022 |
| Shrink Tension (PSI)[13] | | |
| Av. Long. | 360 | 391 |
| Std. Dev. | 15 | 15 |
| 95% C.L. | 24 | 25 |
| Av. Trans. | 505 | 483 |
| Std. Dev. | 28 | 21 |
| 95% C.L. | 44 | 33 |
| Coefficient of Friction At 73° F.[14] | | |
| Av. In/In Static | 0.313 | 0.670 |
| Std. Dev. | 0.010 | 0.376 |
| 95% C.L. | 0.016 | 0.598 |
| Av. In/In Kinetic | 0.284 | 0.325 |
| Std. Dev. | 0.007 | 0.119 |
| 95% C.L. | 0.011 | 0.189 |
| Av. Out/Out Static | 0.292 | 1.010 |
| Std. Dev. | 0.002 | 0.524 |
| 95% C.L. | 0.003 | 0.833 |
| Av. Out/Out Kinetic | 0.263 | 0.444 |
| Std. Dev. | 0.009 | 0.234 |
| 95% C.L. | 0.015 | 0.372 |
| Flow Rate At 230° C. and 21600 grams load (grams/ten minutes)[15] | | |
| Sample 1 | 3.42 | 3.13 |
| Sample 2 | 3.33 | 3.63 |
| Sample 3 | 3.14 | 3.58 |
| Oxygen Transmission At 73° F. [cc STP/(24 hrs., square M, ATM)][16] | | |
| Sample 1 | 9361.2 | 8125.0 |
| Sample 2 | 10372.4 | 11046.9 |
| Sample 3 | 9884.6 | 10174.9 |
| Water Vapor Transmission At 100° F. [grams/(24 hours, 100 square inches)] at 100% RH[17] | | |
| Sample 1 | 1.69 | |
| Sample 2 | 1.87 | |
| Sample 3 | 1.62 | |

The following footnotes apply to Tables I and II.
[0] 100 gauge is equal to 1 mil. The measured thickness of a given film will vary significantly (on the order of 40%) from point to point.
[1] ASTM D882-81
[2] All values in Table I are averages obtained from four (4) replicate measurements.
[3] C.L. Is Confidence Limit - for example, if the reported average value was 10 and the 95% C.L. was 2, then if 100 replicate readings were made, 95 of them would have a value between 8 and 12, inclusive.
[4] ASTM D882-81
[5] ASTM D882-81
[6] ASTM D1938-79
[7] ASTM D3420-80
[8] ASTM D1003-61 (reapproved 1977)
[9] ASTM D2457-70 (reapproved 1977)
[9a] Outside surface measurement.
[10] ASTM D882-81
[11] ASTM D2732-70 (reapproved 1976)
[12] ASTM D2838-81 (shrink force = shrink tension × film thickness in mils × 1000)
[13] ASTM D2838-81
[14] ASTM Sled; ASTM D1894-78
[15] ASTM D 1328-79
[16] ASTM D 3985
[17] ASTM F 372

It should be noted that the prior art mono-layer storm window film did not contain any ultraviolet light stabilizers since this film was intended for use on the interior surface of the window and, accordingly, would not be substantially subjected to ultraviolet light waves.

The data above demonstrates that the present exterior storm window film generally has improved values for (1) haze and (2) gloss as compared to the three layer film. Accordingly, the present storm window film is more desirably adapted for use as an exterior storm window. This difference may be attributable to the different additive package employed in the films.

The tear propagation and ball burst values of the two embodiments of the present film are less than those values for the three layer exterior storm window comparison film and the prior art monolayer interior storm window film. This is believed to result from the fact that embodiments X and Y are approximately (see footnote 1) 60 gauge in thickness and the three layer and monolayer films are 75 gauge and 90 gauge in thickness, respectively. The present embodiments exhibit good tear propagation and ball burst values for film of approximately 60 gauge.

It should be understood that the detailed description and specific examples which indicate the presently preferred embodiments of the invention are given by way of illustration only since various changes and modifications within the spirit and scope of the appended claims will become apparent to those of ordinary skill in the art upon review of the above detailed description and examples.

In view of the above I claim:

1. An oriented multilayer film comprising:
   a cross-linked core layer comprising either (a) an ethylene vinyl acetate copolymer or (b) a three component blend of (1) a linear low density polyethylene, (2) a linear medium density polyethylene and (3) an ethylene vinyl acetate copolymer;
   two cross-linked interior layers each comprising a linear low density polyethylene; and
   two cross-linked surface layers each comprising a three component blend of (1) a linear low density polyethylene, (2) a linear medium density polyethylene, and (3) an ethylene vinyl acetate copolymer, said blend being free of ultraviolet light stabilizers.

2. An oriented five layer film adapted for use as a packaging material comprising:
   a cross-linked core layer comprising either (a) an ethylene vinyl acetate copolymer or (b) a three component blend of (1) from about 40%, by weight, to about 60%, by weight, of a linear low density polyethylene, (2) from about 20%, by weight, to about 30%, by weight, of a linear medium density polyethylene and (3) from about 20%, by weight, to about 30%, by weight, of an ethylene vinyl acetate copolymer;
   two cross-linked intermediate layers each comprising a linear low density polyethylene; and
   two cross-linked surface layers each comprising a three component blend of (1) from about 40% to about 60%, by weight, of a linear low density polyethylene, (2) from about 20% to about 30%, by weight, of a linear medium density polyethylene, and (3) from about 20% to about 30%, by weight, of an ethylene vinyl acetate copolymer, said blend being free of ultraviolet light stabilizers.

3. An oriented five layer film adapted for use as a packaging material comprising:
   a cross-linked core layer consisting essentially of either (a) about 100%, by weight, of an ethylene vinyl acetate copolymer comprising from about 3.3% to about 4.1% vinyl acetate derived units, said ethylene vinyl acetate copolymer having a density of from about 0.9232 to about 0.9250 grams per cubic centimeter at 23 degrees Centigrade or (b) a three component blend of (1) about 55%, by weight, of a linear low density polyethylene having a density of about 0.920 grams per cubic centimeter at 23 degrees centigrade, (2) about 28%, by weight of a linear medium density polyethylene having a density of about 0.935 grams per cubic centimeter at 23 degrees centigrade and (3) about 17%, by weight, of an ethylene vinyl acetate copolymer comprising from about 3.3% to about 4.1% vinyl acetate derived units, said ethylene vinyl acetate copolymer having a density of from about 0.9232 to about 0.9250 grams per cubic centimeter at 23 degrees centigrade;
   two cross-linked intermediate layers each consisting essentially of about 100%, by weight, of a linear low density polyethylene having a density of about 0.920 grams per cubic centimeter at 23 degrees centigrade; and
   two cross-linked surface layers each consisting essentially of a three component blend of (1) about 50%, by weight, of a linear low density polyethylene having a density of about 0.920 grams per cubic centimeter at 23 degrees centigrade, (2) about 25%, by weight, of a linear medium density polyethylene having a density of about 0.935 grams per cubic centimeter at 23 degrees centigrade, and (3) about 25%, by weight, of an ethylene vinyl acetate copolymer comprising from about 3.3% to about 4.1% vinyl acetate derived units, said ethylene vinyl acetate copolymer having a density of from about 0.9232 to about 0.9250 grams per cubic centimeter at 23 degrees centigrade, said blend being free of ultraviolet light stabilizers.

4. The film of claim 2 wherein said ethylene vinyl acetate copolymer comprises from about 2%, by weight, to about 18%, by weight, of vinyl acetate derived units.

5. The film of claim 2 wherein said vinyl acetate copolymer comprises from about 2%, by weight, to about 10%, by weight, of vinyl acetate derived units.

6. The film of claim 2 wherein said ethylene vinyl acetate copolymer comprises from about 2%, by weight, to about 5%, by weight, of vinyl acetate derived units.

7. The film of claims 2 or 3 further comprising a colorant additive to at least one of said layers.

8. The film of claims 2 or 3 further comprising a colorant additive solely in said core layer.

9. The film of claims 2 or 3 which has been cross-linked with from about 1 MR to about 5 MR of irradiation.

10. The film of claims 2 or 3 which has been cross-linked with from about 2 MR to about 4 MR of irradiation.

11. The film of claims 2 or 3 which has been cross-linked with about 3 MR of irradiation.

12. The film of claims 2 or 3 which has been oriented by racking at a racking ratio of from about 4.0 to about 6.0 in both the longitudinal and transverse directions.

13. The film of claims 2 or 3 which has been oriented by racking at a racking ratio of from about 4.5 to about 5.5 in both the longitudinal and transverse directions.

14. The film of claims 2 or 3 wherein (a) the thicknesses of the two surface layers are substantially equal to each other and the sum of the thicknesses of the two surface layers comprise from about 40% to about 60% of the total thickness of the film, (b) the thicknesses of the two intermediate layers are substantially equal to each other and the sum of the thicknesses of the two intermediate layers comprises from about 40% to about 60% of the total thickness of the film, (c) the thickness of the core layer comprises from about 10% to about 30% of the total film thickness and (d) the total film thickness is from about 50 gauge to about 200 gauge.

15. The film of claim 14 wherein the thickness of the core layer comprises about 14% of the total film thickness and the thickness of the two intermediate and the two surface layers each comprise about 21.5% of the total film thickness.

16. An oriented five layer film adapted for use as a packaging material comprising:
 a cross-linked core layer comprising either (a) an ethylene vinyl acetate copolymer or (b) a three component blend of (1) from about 40%, by weight, to about 60%, by weight, of a linear low density polyethylene, (2) from about 20%, by weight, to about 30%, by weight, of a linear medium density polyethylene and (3) from about 20%, by weight, to about 30% by weight, of an ethylene vinyl acetate copolymer;
 two cross-linked intermediate layers each comprising a linear low density polyethylene; and
 two cross-linked surface layers each comprising a three component blend of (1) from about 40% to about 60%, by weight, of a linear low density polyethylene, (2) from about 20% to about 30%, by weight, of a linear medium density polyethylene, and (3) from about 20% to about 30%, by weight, of an ethylene vinyl acetate copolymer;
 the film oriented by racking at a racking ratio of about 5.0 in both the longitudinal and transverse directions.

17. An oriented multilayer film comprising:
 a cross-linked core layer comprising either (a) an ethylene vinyl acetate copolymer or (b) a three component blend of (1) a linear low density polyethylene, (2) a linear medium density polyethylene and (3) an ethylene vinyl acetate copolymer;
 two cross-linked interior layers each comprising a linear low density polyethylene; and
 two cross-linked surface layers each comprising a three component blend of (1) a linear low density polyethylene, (2) a linear medium density polyethylene, and (3) an ethylene vinyl acetate copolymer;
 the film biaxially oriented in the range of about 4.0 to about 6.0 times the original dimensions in both the transverse and longitudinal directions.

* * * * *